United States Patent
Haller et al.

(10) Patent No.: US 9,809,013 B2
(45) Date of Patent: Nov. 7, 2017

(54) SURFACE MATERIAL FOR COATING MELAMINE RESIN LAMINATES

(71) Applicant: Surteco Decor, GmbH, Laichingen (DE)

(72) Inventors: Heinz Haller, Plochingen (DE); Guido Schweizer, Merklingen (DE)

(73) Assignee: SURTECO DECOR, GMBH, Plochingen (DE)

( * ) Notice: Subject to any disclaimer, the term of this patent is extended or adjusted under 35 U.S.C. 154(b) by 50 days.

(21) Appl. No.: 14/443,275

(22) PCT Filed: Nov. 14, 2013

(86) PCT No.: PCT/EP2013/003437
§ 371 (c)(1),
(2) Date: May 15, 2015

(87) PCT Pub. No.: WO2014/075804
PCT Pub. Date: May 22, 2014

(65) Prior Publication Data
US 2015/0290910 A1    Oct. 15, 2015

(30) Foreign Application Priority Data

Nov. 15, 2012 (DE) .................. 10 2012 022 464
Feb. 12, 2013 (DE) .................. 10 2013 002 457

(51) Int. Cl.
*B32B 27/36* (2006.01)
*B05D 7/02* (2006.01)
(Continued)

(52) U.S. Cl.
CPC ........... *B32B 27/36* (2013.01); *B05D 7/02* (2013.01); *B32B 27/06* (2013.01); *B32B 38/10* (2013.01);
(Continued)

(58) Field of Classification Search
CPC ........ C08J 7/045; B05D 7/02; Y10T 428/259; Y10T 428/31786; Y10T 428/31551
See application file for complete search history.

(56) References Cited

U.S. PATENT DOCUMENTS 3,396,046 A * 8/1968 Landau ............... B05D 7/02
106/287.24
2001/0008433 A1 * 7/2001 Fujii ............... G02F 1/13338
349/12
(Continued)

FOREIGN PATENT DOCUMENTS

DE    102004058281 A1    6/2006
DE    202011050027 U1    8/2011
(Continued)

OTHER PUBLICATIONS

International Search Report and Written Opinion of the International Searching Authority, PCT/EP2013/003437, dated Apr. 4, 2014.
(Continued)

*Primary Examiner* — Betelhem Shewareged
(74) *Attorney, Agent, or Firm* — McDonald Hopkins LLC

(57) ABSTRACT

The present invention relates to the use of an abrasion-resistant surface material for the coating of melamine resin laminates and to a laminate comprising the surface material used in accordance with the invention, and to a method for producing the laminate.

19 Claims, 2 Drawing Sheets

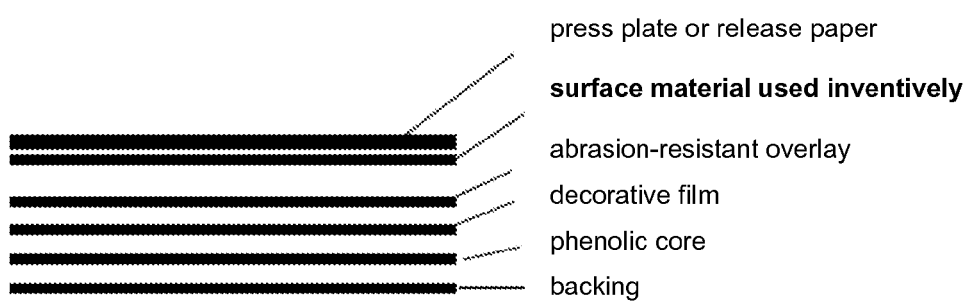

(51) Int. Cl.
　　*B32B 27/06*　　(2006.01)
　　*C08J 7/14*　　(2006.01)
　　*C08J 7/16*　　(2006.01)
　　*B32B 38/10*　　(2006.01)
　　*B44C 5/04*　　(2006.01)
　　*C08J 7/04*　　(2006.01)
　　*B32B 37/24*　　(2006.01)

(52) U.S. Cl.
　　CPC ............... *B44C 5/04* (2013.01); *C08J 7/047* (2013.01); *C08J 7/14* (2013.01); *C08J 7/16* (2013.01); *B32B 2037/243* (2013.01); *B32B 2255/10* (2013.01); *B32B 2255/20* (2013.01); *B32B 2255/26* (2013.01); *B32B 2305/30* (2013.01); *B32B 2307/21* (2013.01); *B32B 2307/412* (2013.01); *B32B 2307/518* (2013.01); *B32B 2307/584* (2013.01); *B32B 2307/714* (2013.01); *B32B 2307/7145* (2013.01); *B32B 2317/125* (2013.01); *B32B 2367/00* (2013.01); *B32B 2451/00* (2013.01); *B32B 2471/00* (2013.01); *C08J 7/045* (2013.01); *C08J 2367/02* (2013.01); *C08J 2400/24* (2013.01); *C08J 2433/04* (2013.01); *C08J 2463/10* (2013.01); *C08J 2467/07* (2013.01); *C08J 2471/00* (2013.01); *C08J 2475/16* (2013.01); *Y10T 428/259* (2015.01); *Y10T 428/31551* (2015.04); *Y10T 428/31786* (2015.04)

(56) References Cited

U.S. PATENT DOCUMENTS

| | | | |
|---|---|---|---|
| 2002/0100547 A1* | 8/2002 | Takahashi | G06K 19/07722 156/289 |
| 2003/0012945 A1 | 1/2003 | Runge et al. | |
| 2005/0078408 A1* | 4/2005 | Nonaka | B32B 5/20 360/97.12 |
| 2008/0075955 A1* | 3/2008 | Sellars | B29C 61/0616 428/347 |
| 2009/0082485 A1* | 3/2009 | Slark | C08F 2/48 522/153 |
| 2011/0236710 A1* | 9/2011 | Lee | C09D 5/086 428/553 |
| 2012/0275105 A1* | 11/2012 | McGuire, Jr. | G11B 25/043 361/679.33 |

FOREIGN PATENT DOCUMENTS

| | | |
|---|---|---|
| EP | 1270698 A2 | 5/2002 |
| EP | 2223800 A1 | 2/2010 |
| GB | 1399624 A | 7/1975 |
| IT | UD20100004 A1 | 7/2011 |
| WO | 2005111606 A2 | 11/2005 |

OTHER PUBLICATIONS

International Preliminary Report on Patentability of the International Searching Authority, PCT/EP2013/003437, dated Aug. 9, 2014.

* cited by examiner

Figure 1:

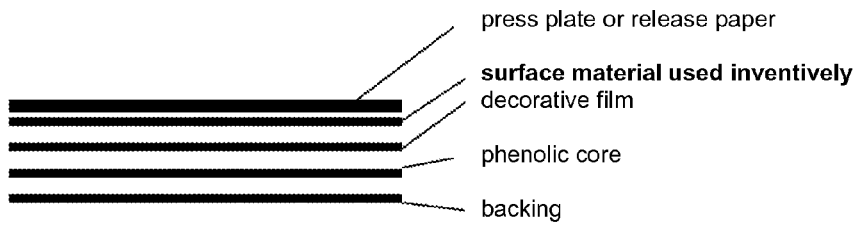

press plate or release paper
surface material used inventively
decorative film
phenolic core
backing

Figure 2:

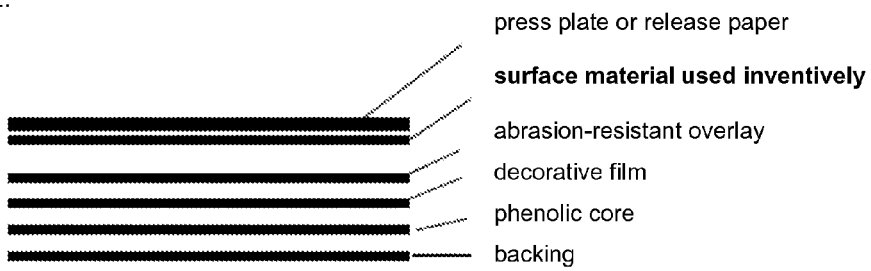

press plate or release paper
surface material used inventively
abrasion-resistant overlay
decorative film
phenolic core
backing

Figure 3:

press plate or release paper
surface material used inventively
prepreg with gluecoat on decoration side

Figure 4:

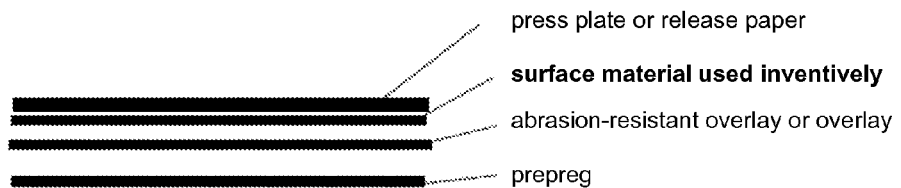

press plate or release paper
surface material used inventively
abrasion-resistant overlay or overlay
prepreg

Figure 5:

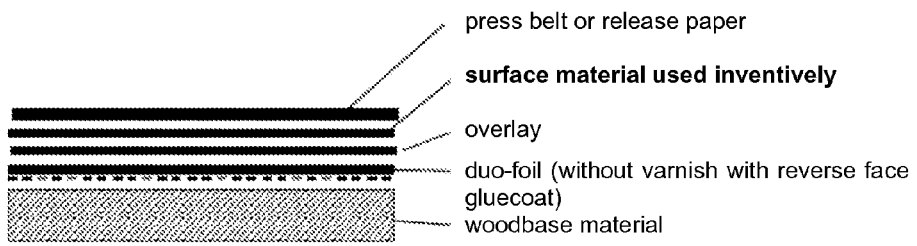

press belt or release paper
surface material used inventively
overlay
duo-foil (without varnish with reverse face gluecoat)
woodbase material

Figure 6:

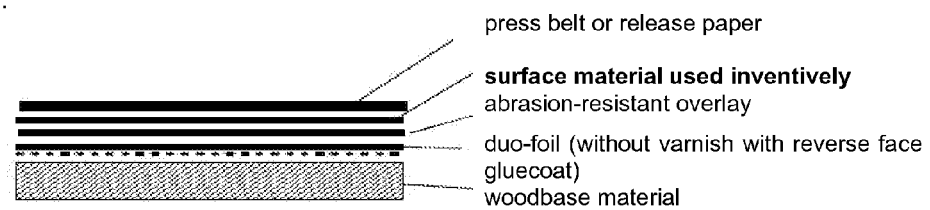

press belt or release paper
surface material used inventively
abrasion-resistant overlay
duo-foil (without varnish with reverse face gluecoat)
woodbase material

Figure 7:

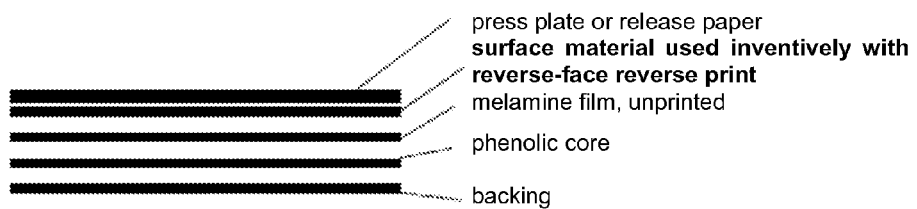

press plate or release paper
surface material used inventively with reverse-face reverse print
melamine film, unprinted
phenolic core
backing

Figure 8:

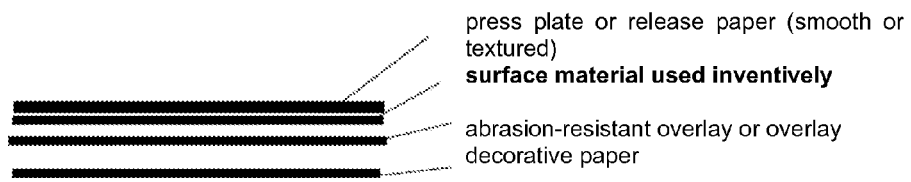

press plate or release paper (smooth or textured)
surface material used inventively
abrasion-resistant overlay or overlay
decorative paper

SURFACE MATERIAL FOR COATING MELAMINE RESIN LAMINATES

This application is a 35 U.S.C. 371 national stage filing and claims priority to PCT Application PCT/EP2013/003437 entitled "SURFACE MATERIAL FOR COATING MELAMINE RESIN LAMINATES," filed Nov. 14, 2013, which claims the benefit of German Application 10 2013 002 457.9 entitled "SURFACE MATERIAL FOR COATING MELAMINE RESIN LAMINATES" filed Nov. 12, 2013, and German Application 10 2012 022 464.8 entitled "SURFACE MATERIAL FOR COATING MELAMINE RESIN LAMINATES" filed Nov. 15, 2012, and International Application PCT/EP2013/001908 entitled "SURFACE MATERIAL FOR COATING MELAMINE RESIN LAMINATES" filed Jun. 28, 2103, each of which is incorporated by reference herein in their entirety.

The present invention relates to the use of a surface material for coating melamine resin laminates and also to a laminate comprising the surface material used in accordance with the invention, and to a method for producing the laminate.

Known in the prior art are decorative laminates which can be used frequently, for example, for producing laminate floors or as surface material for walls, ceilings or furniture items such as cupboards, tallboys, or the like. Decorative laminates of these kinds consist customarily of a substrate, a decorative paper/decorative film, a surface material (overlay) applied thereon, and optionally further functional layers. The surface material in this arrangement is intended to protect the laminate, especially the decorative film, from abrasion. In many cases, however, the surface materials known in the prior art have the disadvantage that the surfaces consist of thermoset resins, such as melamine-formaldehyde resins or phenol-formaldehyde resins, which in some cases have limited chemical resistance, and which have disadvantageous tactile qualities and adversities when used as flooring material, owing to being noisy underfoot.

It is an object of the present invention, therefore, to provide a flexible, polymeric surface material for the coating of melamine resin laminates, this material being distinguished by high scratch resistance and outstanding chemical resistance and exhibiting effective adhesion to the thermoset substrate that results after the corresponding lamination.

This object is achieved by the embodiments of the present invention that are characterized in the claims.

Provided in particular in accordance with the invention is the use of a surface material comprising a polyethylene terephthalate film whose two surfaces have been etched with trichloroacetic acid, with precipitated silica ($SiO_x$) having been used additionally at the etching stage, where one of the etched surfaces of the polyethylene terephthalate film is provided with a varnish, for the coating of melamine resin laminates, particularly as a lamination adhesion promoter within such thermoset melamine substrates.

The polyethylene terephthalate film is preferably biaxially oriented. The thickness of the polyethylene terephthalate film is not subject to any restriction in accordance with the invention. Preferably the thickness is in a range from 12 μm to 100 μm, more preferably from 36 μm to 50 μm.

In accordance with the invention, both surfaces of the polyethylene terephthalate film are etched by treatment with trichloroacetic acid. In accordance with the present invention, precipitated silica ($SiO_x$) is used additionally at the trichloroacetic acid etching stage, and is then incorporated into the surface, where it roughens the surface and constitutes a porous layer. For this purpose, an aqueous suspension of precipitated silica ($SiO_x$) is applied first of all, and then the film is wetted on both sides with trichloroacetic acid. The excess trichloroacetic acid is then drawn off using a wire-wound doctor and airbrush. While the trichloroacetic acid evaporates, $SiO_x$ remains on both sides of the film, with a coverage in the region of 1 g/m$^2$ or below.

Films of this kind are known, for example, from EP 1 270 698 B1 in the context of production of double-sided adhesive tapes, or from WO 2005/111606 A2.

As a consequence of this double-sided surface treatment of the polyethylene terephthalate film, the surface tension as well is raised advantageously to up to 65 dyn/cm, as measurable, for example, using customary commercial test inks or test pins.

In accordance with the invention, moreover, one of the treated surfaces of the polyethylene terephthalate film is provided with a varnish. As a result of the surface treatment of the polyethylene terephthalate film, varnishes advantageously adhere very well to the surface of such a film. In particular, aqueous varnish dispersions and highly crosslinking, radiation-curable varnishes, which do not adhere easily to PET films, exhibit outstanding adhesion. According to one preferred embodiment of the present invention, the varnish is a radiation-curable varnish. According to another preferred embodiment, the varnish is based on an all-acrylate, a urethane acrylate, an epoxy acrylate, a polyester acrylate, or a polyether acrylate. The radiation crosslinking of the varnish has the advantageous effect of producing outstanding scratch resistance on the part of the surface material.

According to a further embodiment, the varnish further comprises antibacterial, antistatic and/or photocatalytic additives. By addition of around 1% of an antibacterial additive, for example, it is possible to achieve an antibacterial quality on the part of the varnished surface. In accordance with the invention, a photocatalytic layer may also have been printed onto the varnish, with the printing ink containing preferably from 7 to 15 wt %, preferably 10 wt %, of nanoscale $TiO_2$ pigments.

According to a further embodiment of the present invention, the surface material, on the surface not provided with a varnish, is provided with a sealing layer, this sealing layer being based preferably on melamine resin in combination with colloidal silica. For this purpose, customarily, 100 parts by weight of liquid melamine resin are mixed with 10 to 100 parts by weight, preferably 20-50 parts by weight, of colloidal silica, available from Grace, for example. In one particularly preferred embodiment of this, it is also possible, in addition to the colloidal silica, for precipitated silica as well to be added, in particle sizes in the range from 5 to 10 μm, and customarily at a concentration of 2 to 10 parts by weight. For the coating operation, clear solutions of a sealing layer composition of this kind, with a solution strength of 30 to 50 wt %, are used. In order to form such a sealing layer, these solutions are then dried. The provision of such a sealing layer on the basis of melamine resin in combination with colloidal silica and, optionally, precipitated silica produces a further improvement in the adhesion, as a result of enhanced affinity for thermoset substrates, especially melamine resins. In one particularly preferred embodiment, a plasma treatment or corona treatment of the polyethylene terephthalate film can be carried out before the sealing layer is applied.

According to a further embodiment of the present invention, the surface material may be provided with a reverse print on the surface not provided with a varnish. By means of a decorative reverse print of this kind, it is possible advantageously to dispense with an additional printed decorative film or with an additional printed decorative paper, when producing a decorative laminate which comprises the surface material used in accordance with the invention, for the decorative configuration of the laminate.

The present invention provides, moreover, a laminate comprising a thermoset substrate and a surface material, used in accordance with the invention, laminated thereon. In the laminate of the invention, the varnished surface of the polyethylene terephthalate film is on the opposite side of the substrate, whereas the unvarnished surface, optionally provided with a sealing layer, points in the direction of the substrate.

According to one preferred embodiment of the present invention, the thermoplastic substrate is a melamine film (decorative paper impregnated with melamine-formaldehyde resin), a phenolic film (paper impregnated with phenolic resin), a plate coated with a thermoset resin, a prepreg, a decorative paper with an overlying overlay, or a duo-foil with an overlying overlay.

For the purposes of the present invention, a (decorative) melamine film, also called decorative film, is a highly filled, opaque, solid-color or printed paper which customarily has a weight of between 50 and 110 $g/m^2$ and which is impregnated with a melamine-formaldehyde resin fraction of approximately 110% to 150% of the paper weight.

Furthermore, phenolic films are understood to be bleached or unbleached kraft papers, preferably in grammages of 100 $g/m^2$ to 200 $g/m^2$, which are impregnated with phenol-formaldehyde resins, the resin fraction amounting preferably to 50% to 100% of the paper weight.

A prepreg is understood to be a decorative paper which in the course of production in the paper machine is already impregnated with an acrylate-type and/or thermoset resin dispersion and is then calendered. The papers may be used in solid-color or printed form and preferably have a weight of 50 to 120 $g/m^2$, more preferably of 50 to 60 $g/m^2$.

According to one preferred embodiment, the thermoset substrate is a decorative paper with an overlying overlay, the decorative paper not having been preimpregnated with a resin dispersion. Decorative papers of this kind, which preferably have a weight of 30 to 70 $g/m^2$, can be printed outstandingly in a decoration gravure process, more particularly better than is possible in the case of prepregs, and are notable accordingly for their advantageously high print quality. A large bank of decorative papers are known, from the laminate floor and furniture industries, which can be used to produce thin laminates having outstanding flexibility (thickness >150 μm). Laminates of this kind, despite high abrasion resistance, are wrappable, with a wrapping radius of up to 1 mm being possible. According to this embodiment of the present invention, the decorative paper is not preimpregnated, but instead the resin excess of the overlay is used for the impregnation of the decorative paper in the method for producing the laminate.

Duo-foil is understood to be a printed or unprinted, decorative, split-resistant paper which is furnished on its reverse side in such a way as to be suitable for a heat-sealing process. The paper weight is preferably 50 to 60 $g/m^2$, with the sealing layer consisting preferably of a material which is thermoset after curing and being applied preferably in an amount of 5 to 30 $g/m^2$, more preferably 10 to 15 $g/m^2$. A duo-foil is described in EP 2 223 800 A1, for example.

An overlay is understood in the context of the present invention to be an unprinted, unfilled paper web which is impregnated with a thermoset resin and which is transparent after curing under pressures of greater than 20 bar and temperatures of between 140° C. and 190° C. The resins that are used for the impregnation may be corundum-free (simple protection for furniture, for example) or else may include corundum particles (particularly abrasion-resistant, for floors, for example) with an average particle size of preferably 30 μm to 100 μm, preferably 60 to 80 μm. The corundum fraction is dependent on the particular desired abrasion class in accordance with DIN EN 13389, and is about 12 $g/m^2$ for AC2, about 17 $g/m^2$ for AC3, about 25 $g/m^2$ for AC4, and about 40 $g/m^2$ for AC5.

In accordance with the present invention, the resins present in the substrate, as is usual in the art, are still not cured prior to compression with the surface material used in accordance with the invention and, optionally, with further functional layers, and are therefore able to flow under a pressure of 20 bar to 100 bar and a temperature of 140° C. to 190° C. The term "flow" means in accordance with the invention that under the conditions stated above, the resin initially softens and is able to penetrate pores and adapt to surface structures, before the onset of curing to a thermoset. This is necessary to allow the surface material used in accordance with the invention to be laminated onto the thermoset, activable substrate.

In accordance with one embodiment of the present invention, the laminate further comprises a decorative film as described above. In this way it is possible to give the laminate a decorative configuration, for example with a single-color or multicolor pattern or by a printed image which is a visual imitation of other coverings, such as ceramic tiles, stone or wood parquet, for example. There is no restriction here on the application of the printed image. Methods of this kind are well known to the skilled person. Particularly preferred, for example, are gravure printing, flexographic printing, and digital printing. Alternatively it is also possible for the surface material used in accordance with the invention on the laminate of the invention to be provided, on that surface not provided with a varnish, with a reverse print, thereby providing the advantageous possibility of doing without a decorative film.

According to another embodiment of the present invention, the laminate further comprises an additional abrasion-resistant overlay. According to one preferred embodiment the additional abrasion-resistant overlay is a transparent, corundum-containing layer to which corundum (aluminum oxide) is added. The particles of corundum in this case preferably have a size, in accordance with the FEPA standard division, of 180 to 320, more preferably of 220 to 240. The amount of the corundum is dependent on the aforementioned abrasion class that is desired. The additional abrasion-resistant overlay preferably has a layer thickness of 30 to 150 μm, more preferably of 50 to 120 μm. The additional abrasion-resistant overlay layer enhances the abrasion resistance of the laminate of the invention, with a printed image, on the decorative film/decorative paper, for example, remaining highly visible by virtue of the transparency that exists.

According to another embodiment of the present invention, the laminate further comprises a phenolic core, comprising one or more phenolic films, as defined above under the term "phenolic film".

According to another embodiment of the present invention, the laminate further comprises a melamine film which acts as a backing. A backing of this kind is customarily located on the underside of the laminate, as an outermost layer, and has the effect in particular of compensating mechanical stresses in the layer assembly. A melamine film used as backing is not required to meet any decorative requirements. Use is therefore made preferably of absorbent papers with relatively low levels of filling that can be impregnated effectively with melamine-formaldehyde resins. Depending on requirement, the papers in question, for example, have grammages of 50 g/m² to 120 g/m², the paper being impregnated, for example, with a resin amount of 120 to 150 wt % of the paper weight. As a backing it is also possible to use unimpregnated parchment papers in grammages of 50 g/m² to 100 g/m².

The optional combination of overlay, especially abrasion-resistant overlay, decorative film, phenolic core and/or backing, and also the sequence of these optional functional layers, are not subject to any particular restriction in the laminate of the invention. According to the desired use and nature of the laminate of the invention, therefore, the skilled person selects one or more of these optional layers and their position within the laminate to be produced.

The present invention further provides a method for producing the laminate of the invention, comprising the compressing of the surface material used in accordance with the invention and of the thermoset substrate, with the surface material used in accordance with the invention, with the varnish layer, constituting the topmost layer to the outside. In accordance with one embodiment of the method of the invention, additionally, an additional abrasion-resistant overlay, a decorative film, a phenolic core and/or a backing are compressed with the surface material and with the thermoset substrate, with the surface material, with the varnish layer, representing the topmost layer to the outside.

The method of the invention is not subject here to any particular restriction. Compressing is carried out preferably under a pressure of 20 bar up to 100 bar and at a temperature of 130° C. up to 190° C., with pressure and temperature being dependent on the processing operation. High-pressure laminates (HPL) are produced preferably under pressures of 80 bar to 100 bar and at temperatures of 130° C. to 150° C., melamine-coated chipboard preferably under pressures of 25 bar to 30 bar and at temperatures of 170° C. to 190° C., and continuous pressure laminates (CPL; continuously produced laminates) preferably under pressures of 25 to 50 bar and at temperatures of 170° C. to 190° C. Curing at high pressure and high temperature is a process known to the skilled person.

Surprisingly, the surface material used in accordance with the invention advantageously has excellent adhesion to the thermoset substrate in a laminate of the invention. This is evident, for example, in a boiling test to EN DIN 438-2, which evaluates the results for the laminate of the invention as being 5 (very good), and also in the chemical resistance with respect to chemicals such as, for example, aqueous sodium hydroxide solution, hydrogen peroxide, citric acid, or acetone. The surface material used in accordance with the invention is further notable for excellent scratch resistance, high transparency, and flexibility. Because the surface material used in accordance with the invention is deformable during the compressing operation and there is no melting of the surface material at temperatures of up to 220° C., the surface material used in accordance with the invention finds diverse application and can be readily used, for example, in HPL, CPL, KT, and CDPL processes, with the skilled person understanding KT (short-cycle) process to comprise the cyclical pressing of melamine films onto chipboard or fiberboard, and the CDPL process to comprise the continuous coating of chipboard and fiberboard with melamine films. The laminate of the invention advantageously affords the possibility of combining the advantages of varnishing with the advantages of a thermoset substrate: Thus on the one hand, for example, the varnishes can be rendered antibacterial, antistatic, and photocatalytic by means of additives, and it is possible to achieve varnish-surface gloss levels of 3 to 90 as measured from an angle of 60°, or 20° or 85°, in accordance with DIN 67530. In this context it may be mentioned that the 20° geometry is used when the gloss level, measured from an angle of 60°, is greater than 70, whereas the 85° geometry is used when the gloss level, measured at 60°, is less than 10. On the other hand, by virtue of the thermoset substrate, the laminate of the invention also features advantageous hardness and stiffness. The laminate of the invention can be used advantageously for a multiplicity of applications, as for example for flooring based on woodbase materials, plastics, and mineral boards, for scratch-resistant and abrasion-resistant flooring and transition strips, furniture, doors, and for wall panels and ceiling panels.

Shown in FIGS. 1 to 8, in each case by way of example, is the construction of a laminate of the invention for a HPL, CPL, or KT process. In the embodiments shown in these FIGS. 1 to 8, a sealing layer based on melamine resin in combination with colloidal silica may be disposed in each case beneath the surface material used in accordance with the invention, on the surface not provided with a varnish. It will be understood here that the embodiments shown in FIGS. 1 to 8 represent merely examples of the present invention and are not limiting on the present invention in respect either of the layers used or of the sequence thereof.

FIG. 1 shows the construction of a laminate comprising the surface material used in accordance with the invention.

FIG. 2 shows the construction of a laminate comprising the surface material used in accordance with the invention, and an additional abrasion-resistant overlay.

FIG. 3 shows the construction of a thin laminate on a prepreg with a primer on the decoration side, comprising the surface material used in accordance with the invention.

FIG. 4 shows the construction of a thin laminate on a prepreg with a primer on the decoration side, comprising the surface material used in accordance with the invention, and an additional abrasion-resistant overlay.

FIG. 5 shows the construction of a thin laminate, comprising the surface material used in accordance with the invention, on a duo-foil basis, for continuous direct lamination to woodbase materials.

FIG. 6 shows the construction of a thin laminate, comprising the surface material used in accordance with the invention, and an additional abrasion-resistant overlay, on a duo-foil basis, for continuous direct lamination to woodbase materials.

FIG. 7 shows the construction of a thin laminate, comprising the surface material used in accordance with the invention, with the transparent surface material being reverse-printed on the reverse side.

FIG. 8 shows the construction of a thin laminate, comprising the surface material used in accordance with the invention and a decorative paper with an (abrasion-resistant) overlay.

What is claimed is:

1. A surface material comprising a polyethylene terephthalate film having first and second surfaces, each surface etched with trichloroacetic acid and precipitated silica (SiOx), and one of the etched surfaces of the polyethylene terephthalate film being provided with a varnish, and wherein the surface material is provided with a sealing layer on the surface not provided with a varnish, said sealing layer being based on melamine resin in combination with colloidal silica.

2. The surface material of claim 1, wherein the polyethylene terephthalate film is biaxially oriented.

3. The surface material of claim 1, wherein the thickness of the polyethylene terephthalate film is in a range from 12 μm to 100 μm.

4. The surface material of claim 1, wherein the varnish is a radiation-curable varnish.

5. The surface material of claim 1, wherein the varnish is based on an all-acrylate, a urethane acrylate, an epoxy acrylate, a polyester acrylate, or a polyether acrylate.

6. The surface material of claim 1, wherein the surface material is provided with a reverse print on the surface not provided with a varnish.

7. A laminate comprising a surface material laminated to a thermoset substrate, the surface material comprising a polyethylene terephthalate film having first and second surfaces, each surface etched with trichloroacetic acid and precipitated silica (SiOx), and one of the etched surfaces of the polyethylene terephthalate film being provided with a varnish, and wherein the surface material is provided with a sealing layer on the surface not provided with a varnish, said sealing layer being based on melamine resin in combination with colloidal silica, the surface material being the outermost layer and the varnished surface of the surface material pointing outward away from the substrate.

8. The laminate as claimed in claim 7, wherein the thermoset substrate is a melamine film, a phenol film, a plate coated with a thermoset resin, a prepreg with an overlying overlay, a decorative paper with an overlying overlay, or a duo-foil with an overlying overlay.

9. The laminate of claim 7, further comprising an abrasion-resistant overlay.

10. The laminate of claim 7, further comprising a decorative film.

11. The laminate of claim 7, further comprising a phenolic core.

12. The laminate of claim 7, further comprising a melamine film which acts as backing.

13. A method for producing a laminate comprising the compressing of a surface material and a thermoset substrate, where the surface material comprises a polyethylene terephthalate film having first and second surfaces, each surface etched with trichloroacetic acid and precipitated silica (SiOx), one of the etched surfaces of the polyethylene terephthalate film being provided with a varnish, and wherein the surface material is provided with a sealing layer on the surface not provided with a varnish, said sealing layer being based on melamine resin in combination with colloidal silica, the surface material with the varnish layer outward constituting the topmost layer.

14. The method as claimed in claim 13, wherein moreover an additional abrasion-resistant overlay, a decorative film, a phenolic core and/or a backing are compressed with the surface material and the substrate.

15. The laminate of claim 7, wherein the polyethylene terephthalate film is biaxially oriented.

16. The laminate of claim 7, wherein the thickness of the polyethylene terephthalate film is in a range from 12 μm to 100 μm.

17. The laminate of claim 7, wherein the varnish is a radiation-curable varnish.

18. The laminate of claim 7, wherein the varnish is based on an all-acrylate, a urethane acrylate, an epoxy acrylate, a polyester acrylate, or a polyether acrylate.

19. The laminate of claim 7, wherein the surface material is provided with a reverse print on the surface not provided with a varnish.

\* \* \* \* \*